May 6, 1958 J. HABAN 2,833,286
CORN SHELLER
Filed June 29, 1954 2 Sheets-Sheet 1

INVENTOR.
Joseph Haban,
BY
Morsell & Morsell
ATTORNEYS

May 6, 1958　　　　J. HABAN　　　　2,833,286
CORN SHELLER
Filed June 29, 1954　　　　　　　　　　2 Sheets-Sheet 2
FIG. 4
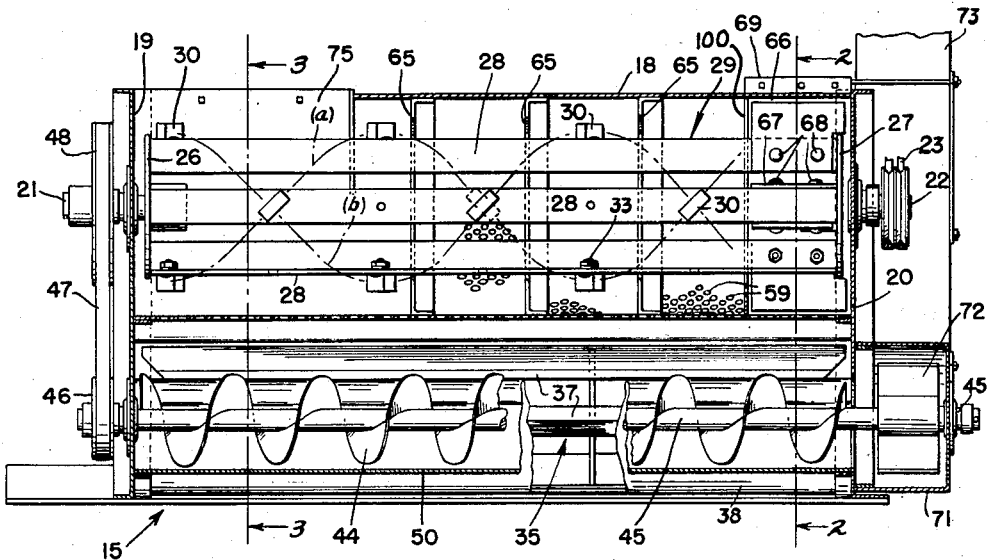
FIG. 5
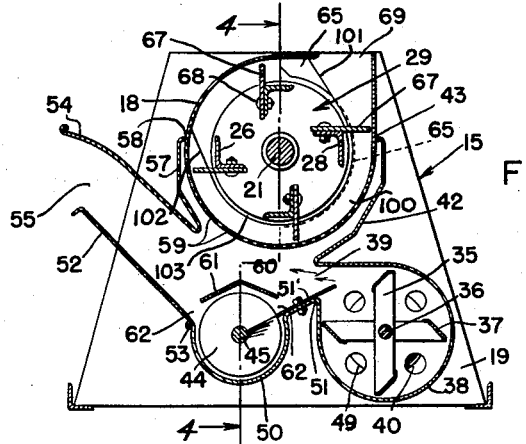
FIG. 2
FIG. 3
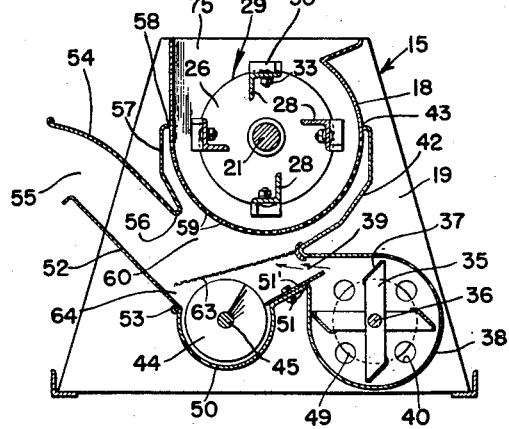
INVENTOR.
Joseph Haban,
BY Morsell & Morsell
ATTORNEYS United States Patent Office 2,833,286
Patented May 6, 1958

2,833,286

CORN SHELLER

Joseph Haban, Sturtevant, Wis.

Application June 29, 1954, Serial No. 440,104

10 Claims. (Cl. 130—6)

This invention relates to improvements in corn shellers having a new type of husker-sheller mechanism.

It is a general object of the present invention to provide an improved device for husking and shelling corn which can be manufactured at relatively low cost; which has a high production capacity; and which is suitable for shelling any kind of corn, including hard, soft, large or small ears, and including northern or southern varieties; the machine having a relatively low feeding height for convenience and being built for rugged service.

A more specific object of the invention is to provide a corn sheller of the type having an open shelling rotor which rotor includes peripherally spaced, axially extending angle irons, one flange of each angle iron being at the periphery of the rotor and having lugs mounted thereon for coaction with the corn, and the other side of each angle iron being disposed to project toward the interior of the rotor to also act on the corn.

A further object of the invention is to provide a corn sheller of small size having a high capacity shelling unit and a high capacity cleaning arrangement of compact size, there being means for effectively disposing of the large volume of kernels, cobs and husks.

A further object of the invention is to provide an improved device for husking and shelling corn wherein the outwardly projecting lugs of the rotor are arranged in spiral formation so that they not only act on the corn to aid in the removal of husks and kernels, but also serve, because of the spiral disposition, to cause progressive feeding movement of the corn from the inlet, at one end of the rotor, toward the husk and cob outlet at the opposite end.

A still further object of the invention is to provide a device as above described where each of the rotor lugs is connected to its angle iron by a single pivot bolt so that its angle of inclination may be easily varied to control the speed of progressive movement of the corn, the arrangement also permitting the lug to be completely reversed when one leading edge wears out.

The lugs may also be easily removed and replaced, or additional lugs may be added to increase the capacity to meet a particular situation.

A further object of the invention is to provide a device as above described wherein there are arcuate stripping and retarding members secured to the casing around the rotor, said retarders being axially spaced relative to the rotor to provide separating stages where shelled corn is separated from the cobs and husks by a new rotary principle, said retarders also preventing kernels from being thrown toward the discharge end and insuring that said kernels have an opportunity to drop through the perforated bottom of the casing into the kernel receiving auger. In conventional devices the cylinder sheller dumps the mass of material out of the cylinder into a separate separating device.

A still further object of the invention is to provide in an improved corn husking and shelling device wherein the rotor is of open form and includes axially extending angle irons, an arrangement whereby the angle irons extend into the husk and cob discharge chamber and serve as supports for fan blades which serve to throw the husks and cobs upwardly out of the discharge conduit therefor, said fan blades being flat to prevent objectionable "wrapping" of husks thereon.

A further object of the invention is to provide apparatus as above described, wherein there is an auger below the rotor and extending axially thereof for receiving kernels of corn and for moving the latter toward a point of discharge, there being a novel arrangement for aerating the kernels as they fall into the auger, which arrangement permits the use of a recleaning screen for effectively separating any remaining chaff or like material from the kernels.

With the above and other objects in view, the invention consists of the improved husker-sheller for corn, and all of its parts and combinations, as set forth in the claims, and all equivalents thereof.

In the accompanying drawings, in which the same reference numerals designate the same parts in all of the views:

Fig. 2 is a transverse sectional view through the device taken approximately on the line 2—2 of Fig. 4;

Fig. 3 is a transverse sectional view through the device taken approximately on the line 3—3 of Fig. 4;

Fig. 4 is a longitudinal sectional view through the device taken approximately on the line 4—4 of Fig. 2;

Fig. 5 is a perspective view of one of the arcuate stripper-retarders alone.

Figure 1:
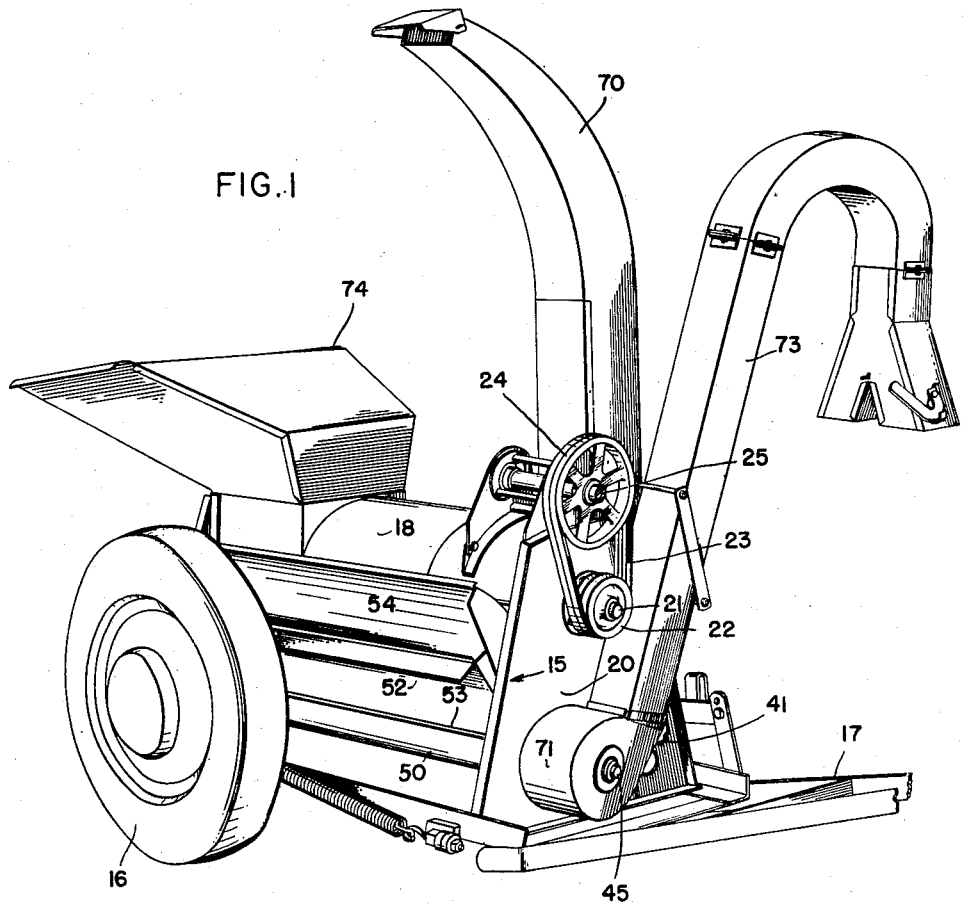
Fig. 1 is a perspective view of a portable husker-sheller for corn constructed in accordance with the present invention.

Referring more particularly to the drawings, the numeral 15 designates a suitable frame of a portable husker-sheller for corn, said frame being shown as mounted on wheels 16 and having a draft member 17 projecting therefrom whereby it may be attached to a tractor, if desired. Extending longitudinally of the frame in the upper portion thereof is a cylindrical casing 18 having its ends supported between end plates 19 and 20.

Journalled longitudinally of the casing through said end plates is a shaft 21 which may be suitably driven from a pulley 22 (see Fig. 1), which pulley is connected by an endless belt 23 with a larger pulley 24 mounted on a shaft 25, the shaft 25 being connectable with the power take-off of a tractor, or being driven in any other suitable manner.

Rigidly connected to the shaft 21 within the cylinder 18 and near opposite ends of the frame are end discs 26 and 27. Extending axially of the shaft 21 and connected at their ends to the end discs 26 and 27 near the peripheries of said discs are angle irons 28, preferably four in number, arranged as is best shown in Fig. 3. Each angle iron has one of its flanges projecting inwardly as shown in Fig. 3, and has its other flange at the periphery and facing outwardly. The assembly just described, including the shaft 21, end discs 26 and 27, and angle irons 28 comprises an open type rotor which is designated generally by the numeral 29.

Figure 6:
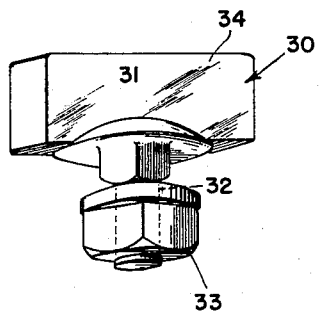
Fig. 6 is a perspective view of one of the adjustable rotor-lugs alone.

Adjustably secured at longitudinally spaced intervals along the outwardly facing flanges of the angle irons 28 are lugs 30. These lugs are shown separately in Fig. 6. Each lug comprises a rectangular block of metal 31 which is secured to the head of a bolt 32 by welding or in any other suitable manner, the bolt being located midway of the length of the block portion 31. The lugs extend through holes in the angle irons 28 and may be rotated in said holes. When nuts 33 are tightened, the lugs are locked in a predetermined angular relationship with respect to the angle irons. A preferred arrangement is shown in Fig. 4 wherein it will be seen that the lugs are arranged to form spirals as indicated by the dot and dash lines (a) and (b). By loosening the nuts 33 the angles of the spirals may be varied to control the speed of progressive movement of material from one end of the rotor to the other. In addition, when the leading edge such as the edge 34 of one of the lugs wears out, the lug may be reversed to use the opposite edge as a leading edge. In addition any lug may be completely removed and replaced. Furthermore, additional lugs than those shown in the drawing may be added to increase capacity if desired.

Extending longitudinally of the frame, below the rotor 29, and preferably extending the full length of the frame is a fan 35 mounted on a shaft 36 and having fan blades 37 which extend the full length of the frame. The fan is mounted in a cylindrical fan casing 38 having a longitudinally extending opening 39 for the tangential discharge of air currents from the fan as indicated by the arrows in Fig. 3.

At one end of the fan housing the end plate 19 of the frame is provided with air admission openings 40. At the other end in the end plate 20 are similar air openings 41 (see Fig. 1). The upper portion of the fan casing 38, above the air discharge opening 39, connects with the lower edge of an apron 42. The upper edge of the apron meets a side of the rotor casing 18, as at 43.

Located parallel to the fan 35 and also below the rotor is an auger 44 for feeding kernels toward a point of discharge. This auger is rigidly mounted on a shaft 45, which is suitably journalled in the frame, and there is a drive pulley 46 at one end. An endless belt 47 which extends around the pulley 46, around a pulley 48 on the rotor shaft 21, and around a pulley 49 on the shaft 36 of the aerating fan 35 causes driving of the fan and auger from the rotor.

The auger is mounted in a trough-like casing 50. The back wall of said casing is flanged over to connect with the upper portion of the front wall of the casing 38 for the aerating fan as at 51, and supported on said flanged portion is an air divider plate 51' having its front edge close to the auger to serve as a stripper and prevent kernels from being thrown into the aerating fan. The opposite edge of blade 51' projects partly over the fan discharge opening 39 to "pinch off" the air. The blade 51' is tangent to the fan rotor and there is a minimum of clearance between it and the rotor. With this arrangement it is possible to get a uniform air discharge from the entire width of a wide fan. An adjustable plate 52 which extends the full length of the frame is hingedly connected as at 53 with the upward edge of the forward wall of the auger housing 50.

Spaced above the plate 52 is a preferably curved plate 54, the two plates providing a discharge spout 55 for chaff, dirt and other material which may be removed from the kernels by the air currents as the kernels are falling into the discharge auger 44. The lower edge of the top plate 54 is suitably connected as at 56 with the lower edge of an apron member 57, the upper edge of the latter being connected to a side of the casing 18 for the rotor as at 58. Said casing 18 has its lower portion perforated as at 59 or otherwise formed with openings throughout the area which extends from the points 43 to 58 (Fig. 3). The perforations are of sufficient size to permit kernels which have been removed by the action of the rotor 29 to fall by gravity therethrough into the aerating space 60. The material which is between the rotor and casing 18 sets up a pressure that helps force the kernels through the perforations of the casing.

In one form of the invention there is a longitudinally extending baffle 61, which is an inverted V in cross section, as shown in Fig. 2 to cover the auger and prevent splashing of kernels out with the chaff. When this device is employed, kernels falling from the perforations 59 are aerated by the air currents from the fan 35 and chaff and other light dirt are removed therefrom and blown out of the opening 55. These kernels drop onto the baffle 61 and air currents can also pick up chaff from the top surface of the baffle. The kernels then fall into the auger 44 through spaces 62.

In Fig. 3, the inverted V-shaped baffle 61 is shown as replaced by a recleaning screen 63. This screen may be connected to the lower edge of the apron 42. The lower edge of the screen in turn must leave an opening between it and 53, for the full length of the screen. With this arrangement accumulations of chaff which leave the lower edge of the screen are picked up by air currents passing between the lower edge of the screen and 53 and are discharged through the spout 55. Some air currents from the fan are continually acting upwardly through the holes in the screen to remove chaff from the corn which is on the screen. The air pressure is such, however, that it cannot pick up relatively heavy kernels and the latter can fall through the holes in the screen while the air pressure from beneath is such that light chaff cannot. If there is a large amount of chaff in a particular batch of corn the opening between the lower edge of the screen 63 and 53 may be increased. With this new cleaning arrangement a very thorough cleaning job can be done with a relatively small screen area. Thus, chaff or other light foreign particles are completely removed from the kernels on the screen and blown out of the opening 55 while the kernels gravitate down the screen to fall into the auger through the space 64.

An important feature of the invention resides in the use in the rotor casing 18 of arcuate stripper-retarder members 65. These members are constructed as shown in Fig. 5 and have one flange suitably secured to the interior of the casing 18, to extend from the top of the casing 18 around the far half only of the casing, terminating midway of the bottom as shown in Figs. 2 and 4. Preferably three of these retarders are used as shown in Fig. 4, and they provide separating stages. When the mass which is being moved by the spiral lugs 30 toward the right hand discharge end hits the retarders 65, its movement is arrested, and shelled corn is given an opportunity to drop to the bottom of the casing 18 to pass through the holes 59.

In conventional shellers the cylinder is loaded and packed full for its entire length. Then the entire mass is churned. With the present invention the cylinder is loaded full only up to the first stripper retarder 65. From this point on, moving toward the right, the material is in loose form, and this is why the present invention can be operated with one-third to one-half less horsepower than is customary. This arrangement also permits both husking and shelling to be performed.

As the material works around to the other side of the rotor it can, however, continue to progress until it hits the next retarder 65. By the time the material has passed the last retarder, all of the kernels have been effectively separated from the cobs and husks. In addition, the retarders prevent the kernels from being thrown by the high speed rotor action toward the discharge end with the possibility of kernels going out of the husk and cob discharge and being wasted. At the extreme right hand end of Fig. 4 is illustrated the discharge chamber 66 for the cobs and husks.

It is to be noted that the angle irons 28 extend into this chamber and that flat thrower blades 67 are connected by bolts 68 to the angle irons. With this arrangement material can slide off the blades with a minimum of friction. Thus, a thrower fan is provided with a minimum of expense. These thrower blades tend to throw the husks and cobs upwardly out of the discharge opening 69 (Fig. 5) and the discharge spout 70 of Fig. 1.

At the inlet side of the discharge chamber 66, the space between the inner periphery of the casing 18 and the rotor 29 is shrouded by a member 100 which projects inwardly from the casing and which has a circular central opening 103 of a size to allow end portions of the angle irons 28 of the rotor 29 to project into the discharge chamber 66. The shrouding member 100 does not extend all the way around the rotor but has a gap between the points 101 and 102 as shown in Fig. 2, which gap is above an upper portion of the rotor to minimize the loss of kernels through the gap, the gap, however, permitting the entrance of cobs and husks into the discharge chamber 66. It is thus apparent that the member 100 forms a partial shroud for one side of the thrower fan blades 67, the end of the casing forming a shroud for the opposite ends of said blades. Thus these thrower blades in effect form a fan which is shrouded at both ends so there is a constant suction acting longitudinally within the casing 18 to pull dust and leaves into the discharge chamber 66 where the latter can be discharged. This suction effect is aided throughout the length of the rotor 29 by the inwardly projecting flanges of the angle-iron members 28, which flanges act as fan blades to help create a suction in conjunction with the action of the blades 67 of the thrower-fan. With this arrangement of having both ends of the blades 67 shrouded, the cobs are discharged with sufficient velocity to carry them 10 to 20 feet away from the unit. This simplifies the loading into an adjacent wagon or truck. Where separation of cobs and husks is required, the present invention does this automatically because of the particular discharge fan construction where both sides are shrouded.

The kernels of corn which fall into the auger 44 are carried along by the auger and are discharged into an outlet casing 71 wherein there is a kernel thrower fan 72 (Fig. 4) mounted on the shaft 45 for the auger. The fan 72 throws the kernels upwardly into the discharge chute 73 shown in Fig. 1.

The portion of the casing 71 which connects with the bottom of the discharge chute 73 has its bottom side cut out so as to provide a relief opening. With this arrangement, if the thrower fan 72 should become clogged up with kernels, so that its speed is so retarded that it cannot throw the kernels any distance up the chute, then these kernels can drop by gravity out of the relief opening which is just below the bottom of the chute 73, and the kernels will pile up on the ground until the clogged condition is relieved. When the thrower is operating normally, the kernels are all thrown past the relief opening.

*Operation*

Summarizing the operation, the corn to be processed is fed into a hopper 74 (see Fig. 1) which directs it into the inlet opening 75 (see Fig. 4) of the shelling rotor. The spirally arranged lugs 30 on the rotor tend to cause progressive movement of the corn toward the right hand end of Fig. 4.

With the rotor operating at 800 to 900 R. P. M., and with the rotor kept well filled with corn, the action of the rotor serves to break up the husks into shorter lengths, and to separate the husks from the ears. The peripheral, outwardly facing flange portions of the angle irons, together with the lugs 30, and together with the rubbing of the ears one against the other and against the interior of the casing 18, causes shelling of the kernels from the ears. In addition, corn which is inside of the open rotor is acted upon by the inwardly projecting flanges of the angle irons 28 to increase the efficiency of the husking and shelling operations.

As before mentioned, the angles of the lugs 30 may be adjusted to change the pitch of the spirals at (*a*) and (*b*) and thus vary the speed of the progressive movement toward the discharge end to best suit the type of corn which is being operated upon.

As heretofore mentioned, the retarder member 65 tends to arrest movement at three different stages to allow the shelled kernels to drop to the bottom of the casing and to pass out of the openings 59 in the lower half of the casing 18. By the time the husks and cobs reach their discharge chamber 66 substantially all kernels have been separated. The husks and the cobs are then thrown out of the discharge chute 70 by the thrower blades 67.

As the shelled kernels drop through the openings 59 in the lower half of the casing 18, they are directed by the apron 42 toward the auger and are completely aerated by the action in the aerating fan 35 which acts throughout the length of the rotor. If the recleaner screen 63 of Fig. 3 is employed, the kernels gravitate down the screen and are aerated by the air passing through the screen from underneath. The space which is inwardly of the inner edge of the V-shaped baffle 61 allows kernels to be thrown up and recleaned a number of times before they are discharged. This also takes place when the screen 63 is being used. The cleaned kernels are then conveyed by the auger to the kernel thrower 72 which throws the kernels upwardly through the chute 73 into a wagon or other receptacle.

Due to the extremely efficient action, the device is suitable for shelling all varieties of corn, including southern corn, which has an excess of husks to normally make husking and shelling more difficult.

It is apparent from the above that the novel lugs 30 and arcuate retarders 65 greatly increase the efficiency of the operation. In addition, it is apparent that the aerating arrangement shown in Figs. 2 and 3 insures thorough cleaning of the kernels.

Various changes and modifications may be made without departing from the spirit of the invention, and all of such changes are contemplated, as may come within the scope of the claims.

What I claim is:

1. In a corn shelling device having a rotor casing, a horizontally disposed shelling rotor rotatably mounted in said casing and having peripherally spaced axially extending angle bars at its periphery, one flange of each angle bar projecting inwardly of the rotor, a fan casing at one end of and in line with said rotor casing, a shroud projecting inwardly from the casing and positioned to separate the fan casing from the rotor casing, ends of said angle bars of the shelling rotor projecting into said fan casing, the inner edge of said shroud being close to said angle bars and said shroud having a gap in its upper portion to permit entrance of cobs and husks into the discharge chamber with a minimum loss of kernels, and fan blades within said fan casing secured against the inwardly projecting flanges of said projecting angle bar ends and projecting outwardly beyond the periphery of the rotor.

2. In a corn shelling device having a rotor casing, a horizontally disposed shelling rotor rotatably mounted in said casing and having peripherally spaced axially extending bars whose faces project inwardly from the periphery of the rotor to provide inwardly directed fan blades throughout the length of the rotor, a thrower-fan casing formed by one end of said rotor casing, ends of said bars of the shelling rotor projecting into said thrower-fan casing, fan blades within said thrower-fan casing secured to said projecting bar portions and projecting outwardly therefrom beyond the periphery of the rotor to act as a thrower for cobs and husks, and partial shrouding means for said thrower-fan blades secured to the interior of the rotor casing and projecting inwardly therefrom just short of the rotor to separate the rotor casing from the fan casing, said shrouding means having an opening whereby cobs and husks may pass into said thrower-fan casing and having a portion of substantial length at the bottom of the rotor casing to minimize loss of kernels into the thrower-fan casing, lugs secured to said rotor bars and projecting outwardly beyond the periphery of the rotor at axially and peripherally spaced intervals thereon in the rotor casing portion, and a retarder extending only part way around the rotor located intermediate the length of the rotor casing and projecting inwardly therefrom and having its inner edges close to the periphery of the rotor, the lugs being axially offset from said retarder and projecting radially outwardly beyond the inner edges of the retarder.

3. In a corn shelling device having a rotor casing, a horizontally disposed shelling rotor rotatably mounted in said casing and having peripherally spaced axially extending bars whose faces project inwardly from the periphery of the rotor to provide inwardly directed fan blades throughout the lengths of the rotor, a thrower-fan casing at one end of said rotor casing, ends of said bars of the shelling rotor projecting into said fan casing, fan blades within said fan casing rotatable with the rotor and projecting outwardly therefrom beyond the periphery of the rotor to act as a thrower for cobs and husks, and partial shrouding means for said fan blades projecting inwardly just short of the rotor to separate the rotor casing from the fan casing, said shrouding means having an opening whereby cobs and husks may pass into said thrower-fan casing and having a portion of substantial length at the bottom of the rotor casing to minimize loss of kernels into the thrower-fan casing, a retarder projecting inwardly from the casing intermediate its length and having its inner edge close to the periphery of the rotor, and lugs projecting radially outwardly from the rotor at spaced intervals throughout is length and positioned in axially offset relation with respect to said retarder and projecting radially outwardly beyond the inner edges thereof.

4. In a corn shelling device having a casing provided with a feed opening near one end, a shelling rotor rotatably mounted on a horizontal axis in said casing, a plurality of axially spaced arcuate retarders secured to the casing and extending only part way therearound and having inner edges close to the periphery of the rotor, at least one of said retarders being located between said feed opening and the mid-point of the length of the rotor and serving to prevent twisting of husks, and axially spaced lugs offset axially from the retarders and projecting radially outwardly beyond the periphery of the rotor a substantial distance beyond the inner edges of the retarders, some of said lugs being located between the feed opening and said twist preventing retarder and other lugs being located between pairs of retarders.

5. In a corn shelling device having a casing provided with a feed opening near one end, a shelling rotor rotatably mounted on a horizontal axis in said casing, a plurality of axially spaced arcuate retarders secured to the casing and having inner edges close to the periphery of the rotor, said retarders extending from the bottom of the casing around one side and terminating at the top of the casing, at least one of said retarders being located between said feed opening and the mid-point of the length of the rotor and serving to prevent twisting of husks, and axially spaced lugs offset axially from the retarders and projecting radially outwardly beyond the periphery of the rotor a substantial distance beyond the inner edges of the retarders, some of said lugs being located between the feed opening and said twist preventing retarder and other lugs being located between pairs of retarders.

6. In a corn shelling device having a casing provided with a feed opening near one end and with a discharge fan chamber at the other end, an elongated shelling rotor mounted in said casing for rotation on a horizontal axis, a plurality of peripherally spaced arcuate retarders projecting from the casing toward the rotor with their inner edges close to the periphery of the rotor and extending only part way therearound, at least one of said retarders being a twist preventer and located between the feed opening and the mid-point in the length of the rotor, lugs offset axially from the retarder and projecting radially outwardly beyond the periphery of the rotor a substantial distance beyond the inner edge of said retarder, some of said lugs being located between the feed opening and said twist preventing retarder and other lugs being located between pairs of retarders, and a shroud projecting inwardly from the casing toward the rotor and positioned to separate the discharge chamber from the rest of the casing, there being a gap in a portion of the shroud permitting the entrance of cobs and husks into the discharge chamber without substantial loss of kernels.

7. In a corn shelling device having a rotor casing, a horizontally disposed shelling rotor rotatably mounted in said casing and having peripherally spaced axially extending angle bars at its periphery, one flange of each angle bar projecting inwardly of the rotor, a fan casing at one end of and in line with said rotor casing, a shroud projecting inwardly from the casing and positioned to separate the fan casing from the rotor casing and having a substantial portion at the bottom of the rotor casing to minimize loss of kernels into the fan casing, ends of said angle bars of the shelling rotor projecting into said fan casing, the inner edge of said shroud being close to said angle bars and said shroud having a gap to permit entrance of cobs and husks into the discharge chamber, and fan blades within said fan casing secured to said projecting angle bar ends and projecting outwardly beyond the periphery of the rotor.

8. In a corn shelling device having a casing provided with a feed opening near one end and with a discharge chamber at the other end, an elongated shelling rotor mounted in said casing for rotation on a horizontal axis, a retarder located between said feed opening and the mid point of the length of the rotor to define the end of a shelling zone for material fed into the feed opening, at least one retarder located between said first-mentioned retarder and the discharge chamber to provide at least two separating stages between the shelling zone and the discharge chamber, and peripherally spaced lugs on the rotor projecting radially outwardly in the shelling zone beyond the periphery of the rotor a substantial distance beyond the inner edges of the retarders, said retarders extending only part way around the casing and having inner edges close to the periphery of the rotor.

9. In a corn shelling device having a rotor casing, a horizontally disposed shelling rotor rotatably mounted in said casing and having peripherally spaced axially extending angle bars at its periphery, one flange of each angle bar projecting inwardly of the rotor, a fan casing at one end of and in line with the rotor casing, a shroud projecting inwardly from the casing and positioned to separate the fan casing from the rotor casing and having a portion of substantial length at the bottom of the casing to minimize loss of kernels into the fan casing, ends of said angle bars of the shelling rotor projecting into said fan casing, the inner edge of said shroud being close to said angle bars and said shroud having a gap to permit entrance of cobs and husks into the discharge chamber, and a fan within said discharge chamber.

10. In a corn shelling device having a rotor casing provided with a feed opening near one end and with a discharge chamber at the other end, a horizontally disposed shelling rotor rotatably mounted in said casing and having one end projecting into the discharge chamber, a shroud projecting inwardly from the casing and positioned to separate the discharge chamber from the rest of the rotor casing, said shroud having a portion of substantial length at the bottom of the casing to minimize loss of kernels into the discharge chamber, the inner edge of said shroud being close to the rotor and said shroud having a gap to permit entrance of cobs and husks into the discharge chamber, a retarder located between the feed opening and the mid point of the length of the rotor to define the end of a shelling zone for material fed into the feeding opening, at least one additional retarder located between said first-mentioned retarder and the discharge chamber shroud to provide at least two separating stages between the shelling zone and said shroud, and peripherally spaced lugs on the rotor projecting radially outwardly in the shelling zone beyond the periphery of the rotor a substantial distance beyond the inner edges of the retarders, said retarders extending only part way around the casing and having inner edges close to the periphery of the rotor.

References Cited in the file of this patent

UNITED STATES PATENTS

| Number | Name | Date |
|---|---|---|
| 36,700 | Beebe | Oct. 21, 1862 |
| 125,566 | Hanna | Apr. 9, 1872 |
| 295,771 | Land et al. | Mar. 25, 1884 |
| 426,856 | Richter | Apr. 29, 1890 |
| 790,289 | Conner | May 23, 1905 |
| 1,072,176 | Scott | Sept. 2, 1913 |
| 1,614,921 | Gilman | Jan. 18, 1927 |
| 2,073,742 | Gilson | Mar. 16, 1937 |
| 2,219,916 | Court | Oct. 29, 1940 |
| 2,271,898 | Mast | Feb. 3, 1942 |
| 2,626,611 | Nixon | Jan. 27, 1953 |
| 2,660,849 | Knowles | Dec. 1, 1953 |